United States Patent
Bernarding et al.

(10) Patent No.: US 7,303,178 B2
(45) Date of Patent: Dec. 4, 2007

(54) ADDITIONAL CONTROL VALVE DEVICE FOR AN INLET CHANNEL OF A RECIPROCATING INTERNAL COMBUSTION ENGINE

(75) Inventors: Eugen Bernarding, Usingen (DE); Thomas Mann, Nidderau-Windecken (DE); Christian Reimann, Wehrheim (DE); Herbert Severien, Linsengericht (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 10/563,806

(22) PCT Filed: Jun. 14, 2004

(86) PCT No.: PCT/EP2004/051103

§ 371 (c)(1),
(2), (4) Date: Mar. 19, 2007

(87) PCT Pub. No.: WO2005/008045

PCT Pub. Date: Jan. 27, 2005

(65) Prior Publication Data

US 2007/0176133 A1   Aug. 2, 2007

(30) Foreign Application Priority Data

Jul. 16, 2003   (DE) ................. 103 32 440

(51) Int. Cl.
*F02D 9/12*   (2006.01)
*F16K 1/12*   (2006.01)

(52) U.S. Cl. ............ 251/129.1; 123/337; 123/585

(58) Field of Classification Search ........... 123/337, 123/361, 399, 585; 251/129.01, 129.1
See application file for complete search history.

(56) References Cited

U.S. PATENT DOCUMENTS

| 4,392,632 | A | 7/1983 | Gast et al. |
| 6,422,184 | B1 | 7/2002 | Kreuter |
| 6,637,405 | B2 | 10/2003 | Kreuter |
| 7,159,847 | B2 * | 1/2007 | Schroeder ............. 251/359 |
| 2003/0024502 | A1 | 2/2003 | Kreuter |

FOREIGN PATENT DOCUMENTS

| DE | 30 26 133 A1 | 2/1982 |
| DE | 37 39 494 A1 | 6/1989 |
| DE | 101 37 828 A1 | 2/2003 |

OTHER PUBLICATIONS

Derwent Abstract—DE10137828; Feb. 20, 2003; Meta Motoren- und Energietechnik GmbH, 52134 Herzogenrath, Germany.
Derwent Abstract—DE3739494; Jun. 1, 1989; Süddeutsche Kühlerfabrik Julius Fr. Behr GmbH & Co KG, 7000 Stuttgart, Germany.
Derwent Abstract—DE3026133; Feb. 18, 1982; Robert Bosch GmbH, 7000 Stuttgart, Germany.

* cited by examiner

*Primary Examiner*—T. M Argenbright

(57) ABSTRACT

The present invention is a supplementary control valve device including a valve body, which may be reversibly displaced in a guide, in the direction of the longitudinal axis, between an opening solenoid and a closing solenoid. The magnetic yoke of the opening solenoid includes at least one extension, with direct contact with a web, connected to the guide on the end thereof facing away from the extension.

7 Claims, 1 Drawing Sheet

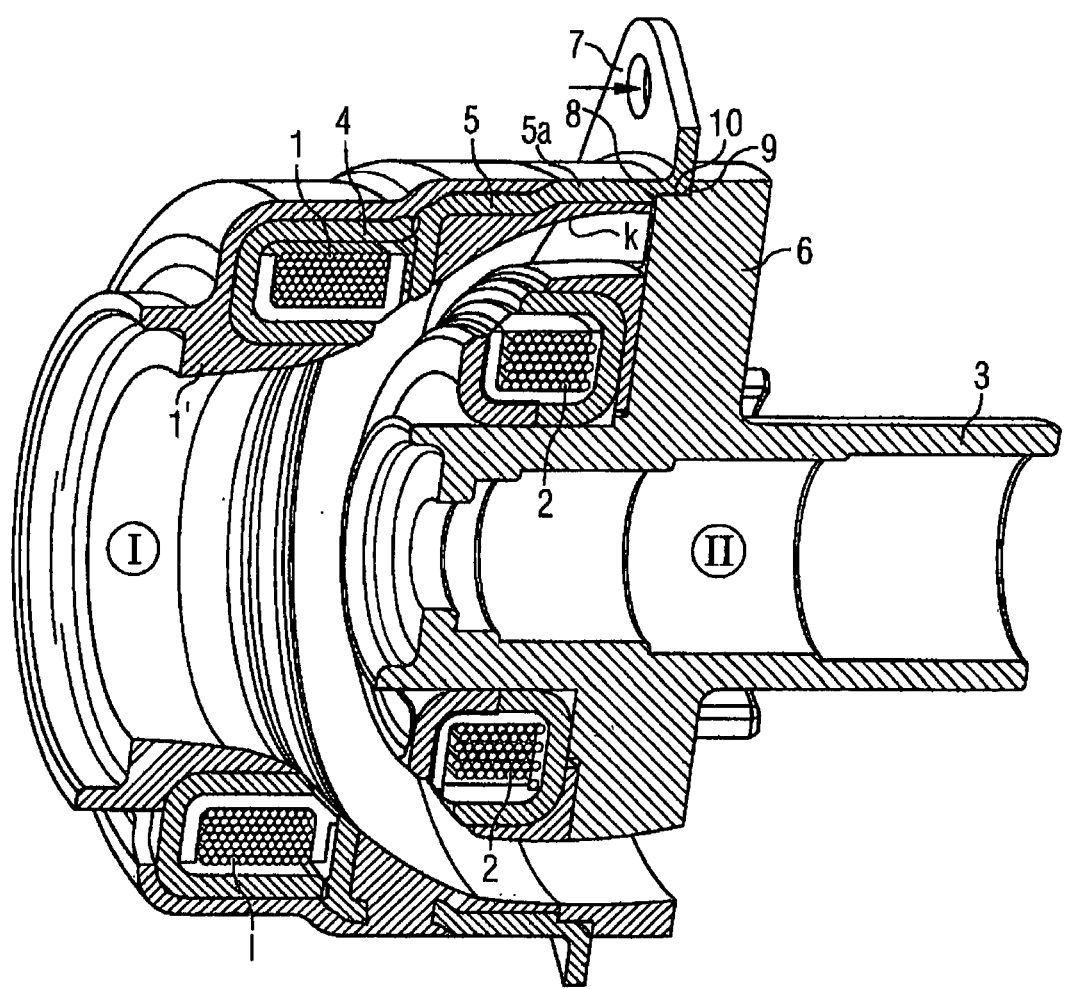

ADDITIONAL CONTROL VALVE DEVICE FOR AN INLET CHANNEL OF A RECIPROCATING INTERNAL COMBUSTION ENGINE

BACKGROUND OF THE INVENTION

The invention relates to an additional control valve device for an inlet channel of a reciprocating internal combustion engine. Additional control valve devices are known. Their method of operation is described, for example, in DE 101 37 828 A1. This additional control valve device provides for a valve element to be arranged, which is essentially mushroom-shaped and is guided such that it can move reversibly in a guide in the direction of the longitudinal axis of the additional control valve device. In this valve element, a plate in the form of a cap is arranged on a stem, and the plate is designed to be concave, with an apex point, toward the side which is remote from the inlet channel. This valve element is moved between the portal magnet and the trap magnet during operation. This results in the respectively desired open position or closed position of the additional control valve device. The stem of the valve element ends at a collar. A first spring is supported between the collar and the base of the blind hole in which the stem is guided. A further spring is supported between the collar and the other end of the blind hole. This results in the valve element together with the two springs forming a system which can oscillate, and is held in a mid-position by the springs. The natural frequency of the system which can oscillate is governed by the spring constants and the weight of the valve element. This ensures that an extremely rapid change is possible between the open position and the closed position, in which case the portal magnet and the trap magnet between which the valve element is guided such that it can move reversibly need in each case apply only the holding force, and the kinetic energy is stored in the springs. However, additional control valve devices such as these have the disadvantage that temperatures of up to 230° C. occur in the portal magnet, resulting in major heat dissipation problems.

SUMMARY OF THE INVENTION

The invention is thus based on the object of providing an additional control valve device for an inlet channel for a reciprocating internal combustion engine, in which it is possible to dissipate the heat that is produced in the portal magnet during operation in the quickest possible manner.

The object on which the invention is based is achieved by an additional control valve device for an inlet channel of a reciprocating internal combustion engine having a valve element, which is guided such that it can move reversibly in a guide in the direction of the longitudinal axis between a portal magnet and a trap magnet, in which device the magnet yoke of the portal magnet has at least one extension which rests directly on at least one web, which is connected to the guide at its end which is remote from the extension. The portal magnet and the trap magnet in each case mean the combination of the coil and magnet yoke. These are toroidal magnets. The valve element is the combination of a stem and a plate in the form of a cap, which is designed to be concave with an apex point toward the side which is remote from the inlet channel. By way of example, the extension of the magnet yoke is partially annular and, if required, can also have a conical profile. It rests directly on at least one web, with one preferred refinement comprising the arrangement of three webs. As associated extension of the magnet yoke must then be provided for each web. The at least one web is composed of metal, preferably of aluminum. It is not essential for there to be a firm joint between the extension and the at least one web. However, in some cases, it may be advantageous to provide fixed joints at points. Surprisingly, it has been found that the amount of heat which is produced in the portal magnet can be dissipated in a simple manner relatively quickly from the additional control valve device if the magnet yoke of the portal magnet has at least one extension which rests directly on at least one web, which is connected to the guide at its end which is remote from the extension. In this case, it is particularly advantageous that the dimensions of the additional control valve device need not be designed to be larger for this purpose.

One preferred refinement of the invention comprises the at least one web being arranged at right angles to the longitudinal axis of the guide. This allows the additional control valve device to be designed to be relatively compact, while its robustness is advantageously improved at the same time.

According to a further preferred refinement of the invention, the at least one web and the guide are composed of a single part. This simplifies the production of the additional control valve device, since the at least one web and the guide can be produced in a single process step.

A further preferred refinement of the invention provides for the extension to form a part of the housing in the end area which rests directly on the at least one web. In this case, the expression housing means that part in which the portal magnet is fixed. This housing is generally composed of plastic. If the end area of the extension forms a part of the housing, then this additionally makes it easier to dissipate heat from the portal magnet via the extension to the surrounding area. At the same time, the robustness of the additional valve control device is increased.

According to a further refinement of the invention, an eye is arranged at that end of the end area which is remote from the portal magnet. The eye is in this case generally arranged particularly advantageously at right angles to the longitudinal axis of the guide. For example, the eye has at least one hole which is used to hold attachment means, such as screws. In this case, it is advantageous that the additional control valve device can be attached as an entity to a frame in the inlet channel of the reciprocating internal combustion engine in a relatively simple manner.

A further preferred refinement of the invention provides for the at least one web to have a first horizontal stop and a second vertical stop for the extension at its end which is remote from the guide. The first horizontal stop in this case has a stop surface which faces the portal magnet. This makes it easier for the extension to make contact with the at least one web in an advantageous manner.

A further refinement of the invention provides for the first horizontal stop and the second vertical stop to have a common edge, and for the extension to have a groove, which is designed to be complementary to the first horizontal stop and to the second vertical stop, at its end which is remote from the portal magnet. This advantageously results in the extension being applied optimally to the at least one web in the smallest possible physical space.

BRIEF DESCRIPTION OF THE SEVERAL VIEWS OF THE DRAWINGS

The invention will be explained in more detail and by way of example in the following text with reference to the drawing (FIGURE), in which:

The FIGURE shows a three-dimensional longitudinal section through the additional control valve device.

DETAILED DESCRIPTION OF THE INVENTION

The FIGURE illustrates a longitudinal section through the additional control valve device for an inlet channel for a reciprocating internal combustion engine, in a three-dimensional form. In this additional control valve device, a valve element (not illustrated) is guided such that it can move reversibly in a guide 3 in the direction of the longitudinal axis between a portal magnet 1 and a trap magnet 2. The internal design of the guide 3 is not illustrated, for clarity reasons. The magnet yoke 4 of the portal magnet 1, which comprises a plurality of parts, has at least one extension 5 which rests directly on at least one web 6, which is connected to the guide 3 at its end which is remote from the extension 5. The at least one web 6 is in this case arranged at right angles to the longitudinal axis of the guide 3. The at least one web 6 and the guide 3 are in this case composed of a single part. In the end area 5a which rests directly on the at least one web 6, the extension 5 forms a part of the housing 1'. An eye 7 is arranged at that end of the end area 5a which is remote from the portal magnet 1. At its end which is remote from the guide 3, the web 6 has a first horizontal stop 8 and a second horizontal stop 9 for the extension 5. The first horizontal stop 8 and the second vertical stop 9 have a common edge, and the extension 5 has a groove 10, which is designed to be complementary to the first horizontal stop 8 and to the second vertical stop 9, at its end which is remote from the portal magnet 1. This results in the extension 5 resting on the at least one web 6 in a very small physical space in a particularly advantageous manner, so that the profile of the flow edge k can be optimized in a particularly simple manner by appropriately machining the housing 1' in which the portal magnet 1 is fixed. The trap magnet 2 is arranged in a particularly preferable manner directly on the guide 3. This ensures that even the heat which occurs in the trap magnet 2 can be dissipated quickly and easily from the additional control valve device. However, it is also possible to fix the trap magnet 2 in position in the additional control valve device in a different way. The additional control valve device can be attached, for example, to a frame in a particularly simple advantageous manner via the eye 7. For this purpose, an attachment means, for example a screw, is inserted into the hole in the eye 7 in the direction of the arrow, and is screwed to the frame. In this case, it is also advantageous that this type of attachment results in the first unit element I., which essentially comprises the portal magnet 1, the housing 1' as well as the extension 5 with its end area 5a and the eye 7, being caused to rest firmly on the second unit element II. which, inter alia, comprises the trap magnet 2, the at least one web 6 as well as the guide 3. It is also advantageous that an optimum distance can be set between the first unit element I. and the second unit element II., and between the portal magnet 1 and the trap magnet 2, by means of the first horizontal stop 8 and the second vertical stop 9 in conjunction with the complementary groove 10. This likewise allows the movement profile of the valve element (not illustrated) between the portal magnet 1 and the trap magnet 2 to be optimized without any necessity for a firm joint between the first unit element I. and the second unit element II.

The invention claimed is:

1. An additional control valve device for an inlet channel of a reciprocating internal combustion engine having a valve element, which is guided such that it can move reversibly in a guide in the direction of the longitudinal axis between a portal magnet and a trap magnet, with the portal magnet being fixed by a housing, the device comprising the housing composed of plastic and the magnet yoke of the portal magnet having at least one extension which rests directly on at least one web, which is connected to the guide at its end which is remote from the extension.

2. The additional control valve device according to claim 1, wherein the at least one web is arranged at right angles to the longitudinal axis of the guide.

3. The additional control valve device according to claim 1, wherein the at least one web and the guide are composed of a single part.

4. The additional control valve device according to claim 1, wherein the extension forms a part of the housing in the end area which rests directly on the at least one web.

5. The additional control valve device according to claim 4, wherein which an eye is arranged at that end of the end area which is remote from the portal magnet.

6. The additional control valve device according to claim 1, wherein the at least one web has a first horizontal stop and a second vertical stop for the extension at its end which is remote from the guide.

7. The additional control valve device according to claim 6, wherein which the first horizontal stop and the second vertical stop have a common edge, and the extension has a groove, which is designed to be complementary to the first horizontal stop and to the second vertical stop, at its end which is remote from the portal magnet.

* * * * *